(12) United States Patent
Hsu

(10) Patent No.: US 6,370,937 B2
(45) Date of Patent: Apr. 16, 2002

(54) METHOD OF CANCELING QUADRATURE ERROR IN AN ANGULAR RATE SENSOR

(75) Inventor: Ying W. Hsu, Huntington Beach, CA (US)

(73) Assignee: Microsensors, Inc., Costa Mesa, CA (US)

(*) Notice: Subject to any disclaimer, the term of this patent is extended or adjusted under 35 U.S.C. 154(b) by 0 days.

(21) Appl. No.: 09/812,147

(22) Filed: Mar. 19, 2001

Related U.S. Application Data

(60) Provisional application No. 60/190,271, filed on Mar. 17, 2000.

(51) Int. Cl.[7] ................................................. G01P 9/04
(52) U.S. Cl. ............................................................ 73/1.37
(58) Field of Search ................................ 73/1.37, 1.38, 73/504.02–504.04, 504.12

(56) References Cited

U.S. PATENT DOCUMENTS

| | | | |
|---|---|---|---|
| 5,600,064 A | | 2/1997 | Ward |
| 5,955,668 A | * | 9/1999 | Hsu et al. ................ 73/504.12 |
| 5,992,223 A | * | 11/1999 | Clark ........................ 73/514.35 |
| 6,230,563 B1 | * | 1/2001 | Clarck et al. ............ 73/504.12 |

* cited by examiner

Primary Examiner—Robert Raevis
(74) Attorney, Agent, or Firm—Joseph C. Andras; Myers, Dawes & Andras LLP

(57) ABSTRACT

Disclosed is a method of correcting quadrature error in a dynamically decoupled micro-gyro (100, 200) having a drive mass (110, 210) that is vibrated relative to a drive axis (Y, Z) and a sense mass (111, 211) that responds to the drive mass (110, 210) in the presence of an angular rate and associated coriolis force by vibrating relative to a sense axis (X, Y). The method includes the steps of providing a first static force element (121, 221) for applying a first steady-state force to a first region of the drive mass (110, 210); providing a second static force element (122, 222) for applying a second steady-state force to a second region of the drive mass (210), and applying a corrective steady-state force to the drive mass (110, 210) with the first and second static force elements (121, 122; 221, 222), the corrective steady-state force making the drive axis (Y, Z) of the drive mass (110, 210) orthogonal to the sense axis (X, Y) of the sense mass (111, 211). In the rotational embodiment, the static force elements are located at +Y and −Y directions.

15 Claims, 6 Drawing Sheets

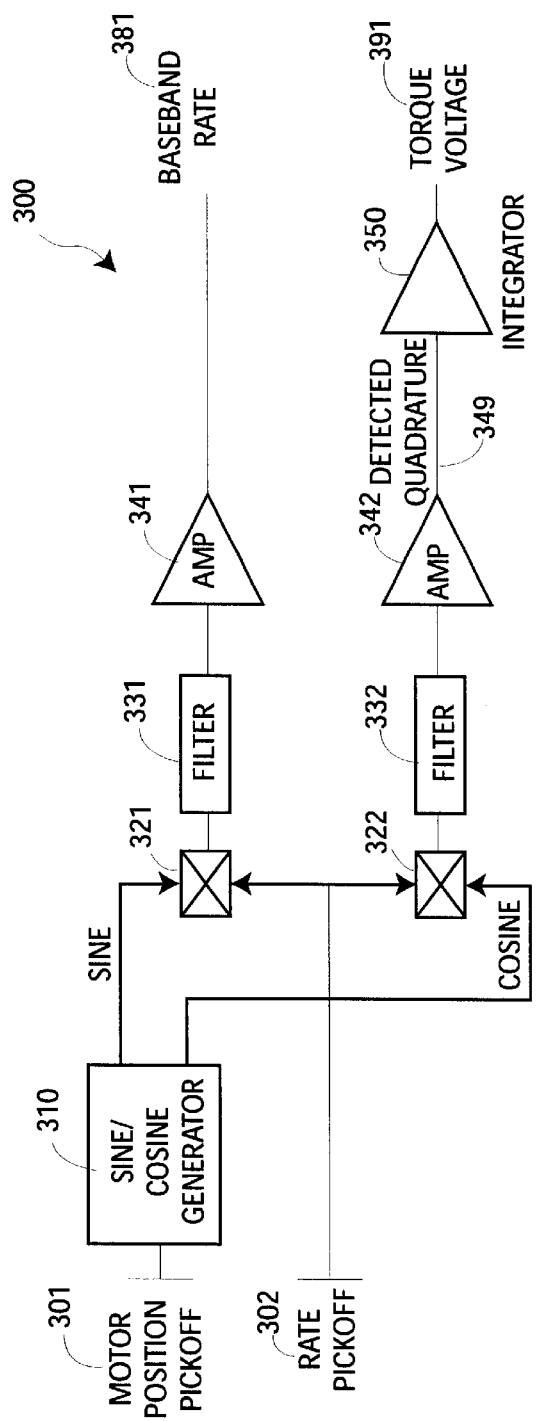
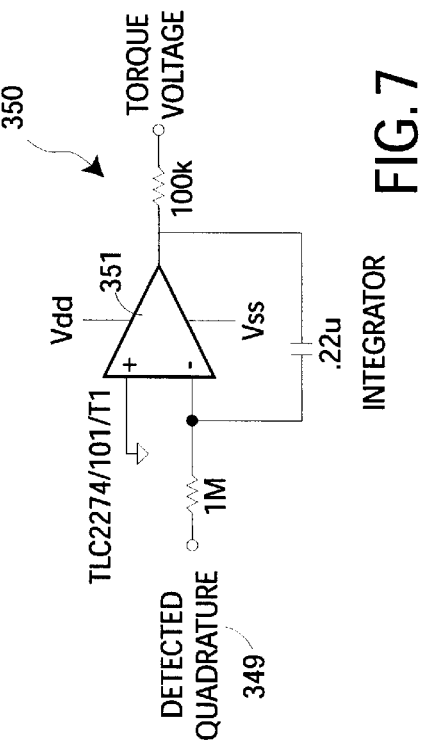
FIG. 6
FIG. 7

METHOD OF CANCELING QUADRATURE ERROR IN AN ANGULAR RATE SENSOR

I hereby claim the benefit under 35 U.S.C. 119(e) of United States provisional application No. 60/190,271 filed on Mar. 17, 2000.

FIELD OF THE INVENTION

The present invention relates generally to sensors and, more particularly, to a method of canceling quadrature error in a dynamically decoupled angular rate sensor.

BACKGROUND OF THE RELATED ART

This invention involves a class of sensors that use a vibratory element for measuring angular velocity. These sensors (including others of different construction) are commonly referred to as gyros (for gyroscopes), or in the case or very small gyros, micro-gyros. In micro-gyros, the elements are small, typically around 1 square millimeter.

Micro-gyros are generally produced from silicon wafers, using photolithographic techniques, in accordance with the principles of Micro-Electro-Mechanical Systems (MEMS). The small size of these elements is necessary to enable the production of large numbers of micro-gyros from a single silicon wafer using micro-fabrication techniques.

A micro-gyro measures the angular rate of rotation about an input axis or so-called "rate axis". Micro-gyros may generally be classified as linear or as rotary. In either case, a mass is driven into vibration relative to a "drive axis" that is orthogonal to the rate axis. An electrostatic comb-drive structure is commonly used to oscillate the mass.

In a "linear" micro-gyro, the mass is driven to vibrate along the drive axis. In a "rotary" micro-gyro, the mass is driven to vibrate about the drive axis. In either case, if the mass is subject to rotation about the sensor's rate axis at some angular rate of rotation, then coriolis forces acting on the vibrating mass will naturally cause it to also vibrate along or about a "sense axis" that is orthogonal to the rate and drive axes.

Some micro-gyro embodiments have only a single "proof mass" that is both driven and sensed. U.S. Pat. No. 5,992,233 entitled "MICROMACHINED Z-AXIS VIBRATORY RATE GYROSCOPE" is representative of a linear micro-gyro wherein a single "proof mass" is driven into vibration along a drive axis and wherein coriolis-induced motions of that same proof mass are detected along a sense axis that is orthogonal to the drive axis. The proof mass, in other words, is both the drive mass and the sense mass.

Other micro-gyros provide a drive mass that quite literally carries a sense mass. The sense mass is coupled to and moves with the drive mass as both vibrate along the drive axis, but the sense mass is free to move along the sense axis under the presence of coriolis forces.

The unique micro-gyros developed by the assignee of this invention are statically "de-coupled" in that the drive mass and sense mass may move independently of one another. In the absence of rotation rate, and under ideal conditions, the driven mass is vibrated but the sense mass remains still. In the presence of rotational rate, however, coriolis-induced energy is dynamically transferred from the drive mass (vibratory element) to the sense mass through suitably designed flexures. The operational concepts of a decoupled micro-gyro design are disclosed in U.S. Pat. No. 5,955,668, commonly owned by the assignee of this invention and hereby incorporated by reference in its entirety.

A major challenge in designing the above-described micro-gyros is dealing with manufacturing imperfections and expected variations due to normal manufacturing tolerances. In operation, as explained above, the vibratory element is driven to oscillate along or about the drive axis. When the vibrated element is subject to an angular velocity about the rate axis, the vibrated element responds by exhibiting a small vibration along or about the third direction, or sense axis. In the ideal micro-gyro, the input, rate and sense axes are mutually orthogonal.

A major source of error in micro-gyros is "quadrature error," a condition that relates to the erroneous coupling of drive motion into sense motion in the absence of a rotational rate. This coupling is caused by imperfections in the manufacturing process. More particularly, the coupling will occur whenever the support structures that cause the vibrating element or elements to move along the input and output direction are not perfectly orthogonal. The output signal induced by such drive error is usually referred to as the quadrature signal. The output signal or sense signal in an imperfect micro-gyro, therefore, contains both the desirable rate signal and the undesirable quadrature signal.

FIG. 1 is a simplified diagram of a linear micro-gyro wherein the vibratory element consists of a single mass 10. The present invention is most easily applied to a dynamically decoupled micro-gyro, but it is helpful to start with an explanation of a single-mass gyro like this one in order to understand quadrature error. Here, when the mass 10 is vibrated along the perfect drive path 21, then the mass 10 will respond to rotation about a rate axis that is perpendicular to the paper by exhibiting a small degree of vibration along the sense path 31. If manufacturing imperfections cause the mass 10 to vibrate along the imperfect drive path 22, rather than the perfect path 21, then the drive has a quadrature error component 23 that is parallel to the sense path 31. The quadrature component 23 of the imperfect drive 22 is nominally detected as sense vibration.

Quadrature error is troublesome because the error signal can be very much larger than the sense signal induced by coriolis forces. Because of this, the industry has undertaken considerable effort to eliminate and/or compensate for quadrature error.

One common method used to remove the quadrature error is known as "synchronous demodulation." It relies on the fact that the rate signal is 90 degrees out-of-phase relative to the quadrature signal, meaning that the rate signal is in-phase with the drive signal. It operates by multiplying the output containing both rate and quadrature with the drive signal, and then passing the resultant signal through a low pass filter. This method works with limited effectiveness because the quadrature is typically 10,000 to 100,000 times larger than the rate at the low range of operation. The relatively large magnitude of quadrature means that error due to phase needs to be tightly controlled, typically to 0.01 degree or lower. This stringent phase control must also be maintained over the full operating temperature range.

The '233 patent first discussed above offers another method of quadrature error correction. In particular, it reveals a technique for active correction of quadrature by applying an oscillatory force that counteracts the inaccuracy of movement as the mass moves along the drive axis. The technique disclosed in the '233 patent, however, has several major shortcomings:

First, it can only be used with linear micro-gyros having a mass that vibrates along an axis and not with rotary micro-gyros that have a mass vibrates about an axis.

Second, in order to avoid affecting the coriolis signal, the correction forces must be applied in exact magnitude proportional to the position of the element along the path. The further away is the element from its neutral position, the higher the correction is required.

Third, the same electrodes used for reducing quadrature are also used for affecting the frequency of the element about the sense axis, resulting in a compromise between reducing quadrature or frequency mismatch. The same electrodes are also used for sensing the deflection of the mass element.

Fourth, the oscillatory input may have a parasitic capacitance coupling into electrodes used to measure sense output.

The known methods of correcting for quadrature error need improvement and, even if improved, the known methods are not well-suited for use in a decoupled micro-gyro. There remains a need, therefore, for an improved method of canceling quadrature error in an angular rate sensor and, more particularly, for a method of correcting quadrature error that is suitable for use in a decoupled micro-gyro.

SUMMARY OF THE INVENTION

The invention resides in a method of correcting quadrature error in a dynamically decoupled micro-gyro having a drive mass that is vibrated relative to a drive axis and a sense mass that responds to the drive mass in the presence of an angular rate about a rate axis and a corresponding coriolis force by vibrating relative to a sense axis, the method comprising the steps of: providing a first static force element for applying a first steady-state force to a first region of the drive mass; providing a second static force element for applying a second steady-state force to a second region of the drive mass; and applying a corrective steady-state force to the drive mass with the first and second static force elements, the corrective steady-state force re-orienting the drive mass to make the drive axis of the drive mass orthogonal to the sense axis of the sense mass. The corrective steady-state force preferably re-orients the drive mass by repositioning the drive mass about the rate axis. The static force elements may generate the necessary forces in any suitable manner, but the preferred static force elements comprise first and second electrodes that provide an electrostatic force.

In the preferred embodiment, the method comprises the further steps of: connecting the drive mass to a ground voltage; holding one of the first and second electrodes at the ground voltage; and setting the other of the first and second electrodes to a voltage that is different than the ground voltage such that a corrective steady-state force of suitable direction and magnitude is applied to the drive mass.

BRIEF DESCRIPTION OF THE DRAWINGS

The just summarized invention can be best understood with reference to the following description taken in view of the drawings of which:

FIG. 6 is a block diagram of the presently preferred control circuitry; and

FIG. 7 shows the presently preferred circuitry for implementing the integrator 350 of FIG. 6.

DETAILED DESCRIPTION OF THE PREFERRED EMBODIMENTS

Figure 2:
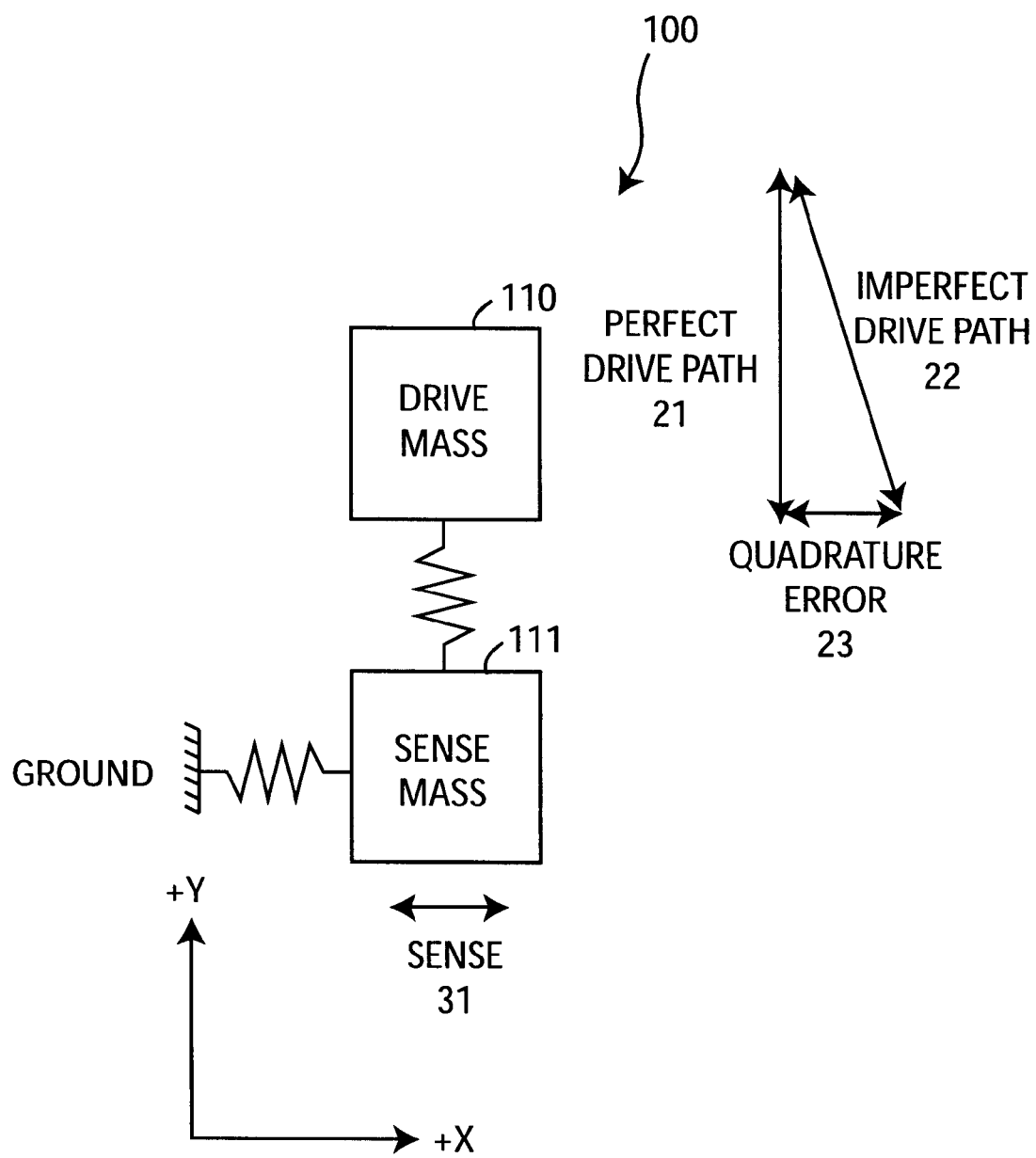
FIG. 2 is a simplified diagram of a linear Z-axis microgyro 100 of decoupled construction wherein a drive mass is dynamically coupled to a sense mass through a flexure, a quadrature component of the drive path being coupled into the sense path as quadrature error.
Figure 4:
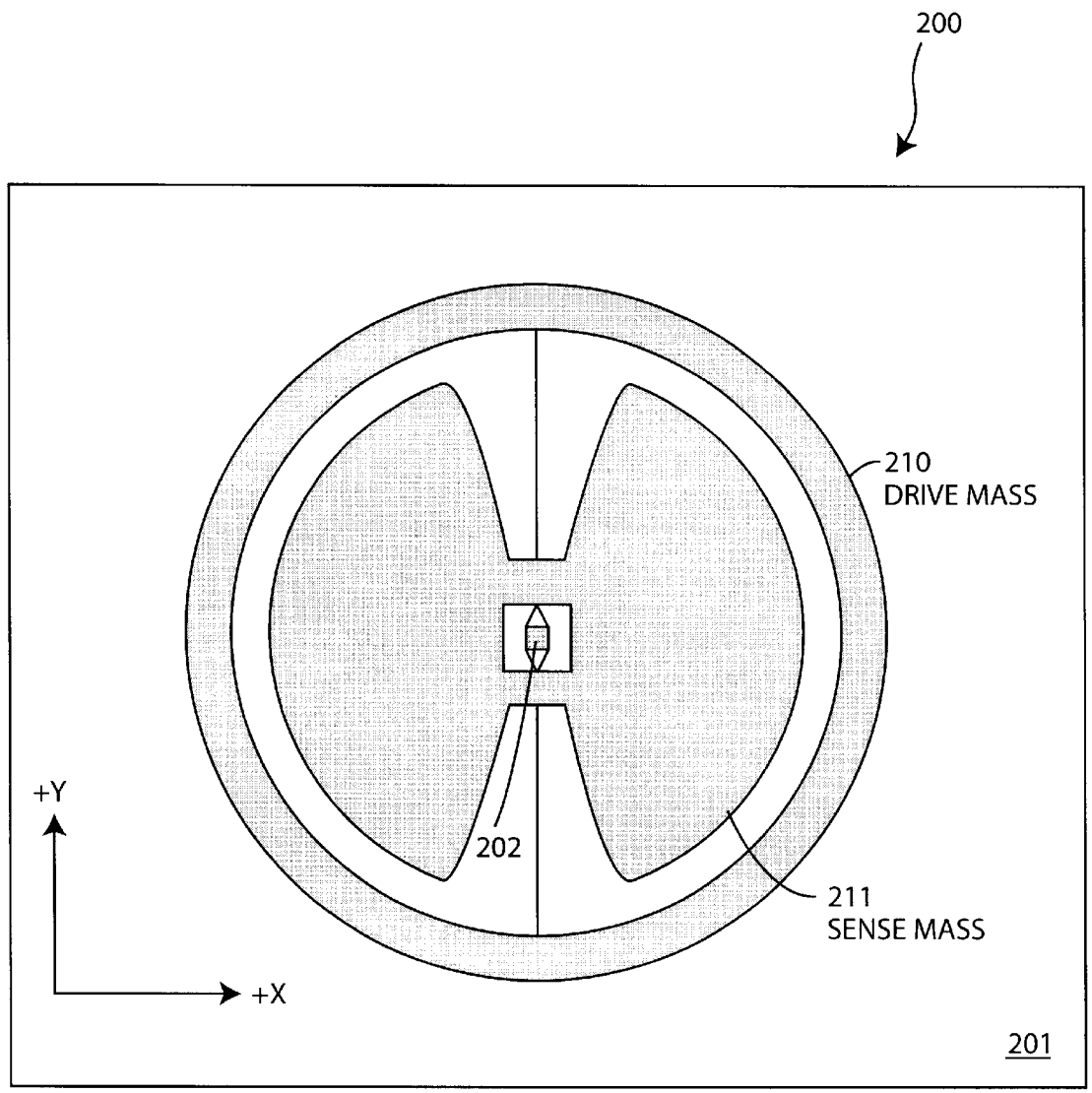
FIG. 4 is a simplified diagram of a rotary X-axis microgyro 200 of decoupled construction wherein a ring-shaped mass 210 is mechanically constrained to vibrate about a drive axis (Z) and a disk-shaped sense mass 211 is constrained to rock about an output axis (Y)

The method of canceling quadrature error according to this invention can be used with any decoupled micro-gyro. To that end, FIGS. 2 and 4 are exemplary micro-gyros of vibratory, dynamically decoupled nature that can benefit from presently preferred embodiments.

The innovation is a method of removing quadrature by applying a static counterforce to physically re-orient the relative position of the two axes of motion. In more detail, the invention provides a static, steady-state force for correcting quadrature error within a decoupled micro-gyro.

Figure 1:
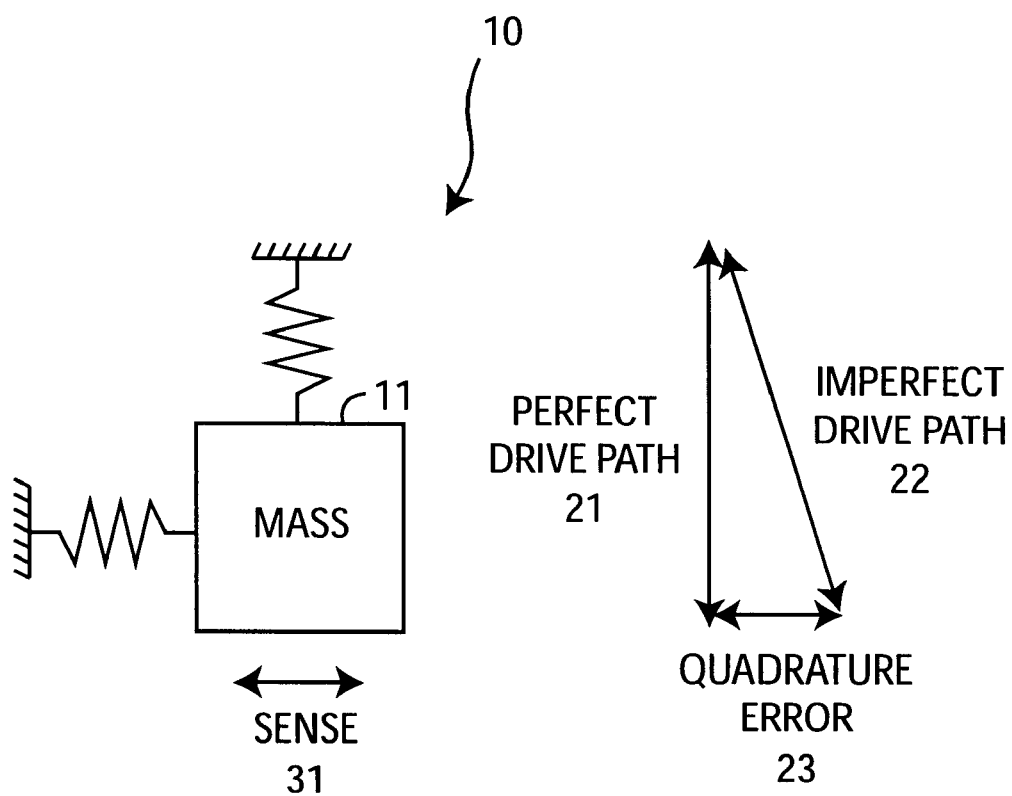
FIG. 1 is a simplified diagram of a linear Z-axis microgyro 10 of conventional single-mass construction, a quadrature component of the drive path being coupled into the sense path as quadrature error.

A brief discussion of single-mass micro-gyros may help clarify the present invention. FIG. 1 shows a single-mass gyro 10. The '233 patent discloses a single mass gyro. With a single-mass gyro 10 like that shown in FIG. 1, or disclosed in the '233 patent, it is impossible to re-orient the drive axis relative to the sense axis because those two axes are "frozen" within the single mass 11. The sense axis is inalterably linked to the drive axis. Accordingly, if the vibrating mass 11 is subject to an oscillatory quadrature error as disclosed in the '233 patent, then it is necessary to apply an oscillatory force to counteract that error. The oscillatory correction must be just so at any one moment, but it is always possible to overcorrect or undercorrect. In essence, the cure may be worse than the disease.

The method of this invention works in the context of a dynamically decoupled micro-gyro because it is, the inventor realized, possible to re-orient the drive axis relative to the sense axis in such context. The inventor realized, in particular, that quadrature error stems from an imperfection in the relative orientations of these two reference axes. By re-orienting one of the axes to re-align the axes with respect to each other, the quadrature can be removed or reduced.

In a decoupled micro-gyro design like those of FIGS. 2–5, the drive mass and the sense mass are two separate elements. As a result, the movement of the drive mass defines the drive axis and the movement of the sense mass defines the sense axis. Consequently, it is possible to remove or reduce quadrature error that is nominally present from manufacturing issues by applying a steady-state mechanical force that varies one axis of motion to make the orientation of the two axes of motion perfectly orthogonal.

Linear Embodiment

FIG. 2 is a diagrammatic view of a dynamically decoupled, linear motion micro-gyro 100 having a drive mass 110 and a sense mass 111. The operational concepts of a decoupled micro-gyro design of this nature are disclosed in U.S. Pat. No. 6,089,089, commonly owned by the assignee of this invention and hereby incorporated by reference in its entirety.

As shown, the drive mass 110 is driven along the Y-axis along a drive path. If the mass 110 is driven along the perfect drive path 21, and if the drive mass 110 is subject to an angular rate of rotation about the Z-axis, then coriolis-induced energy is dynamically transferred to a sense mass 111 which then moves along the X-axis in a sense direction 31. If the mechanics cause the drive mass 110 to move along the imperfect drive path 22, rather than the perfect one 21, then a quadrature error component 23 of that motion will couple into the sense mass 111 and cause it to move along the sense direction 31 even in the absence of an angular rate of rotation. The sense mass 111, in other words, will exhibit a false positive.

Figure 3:
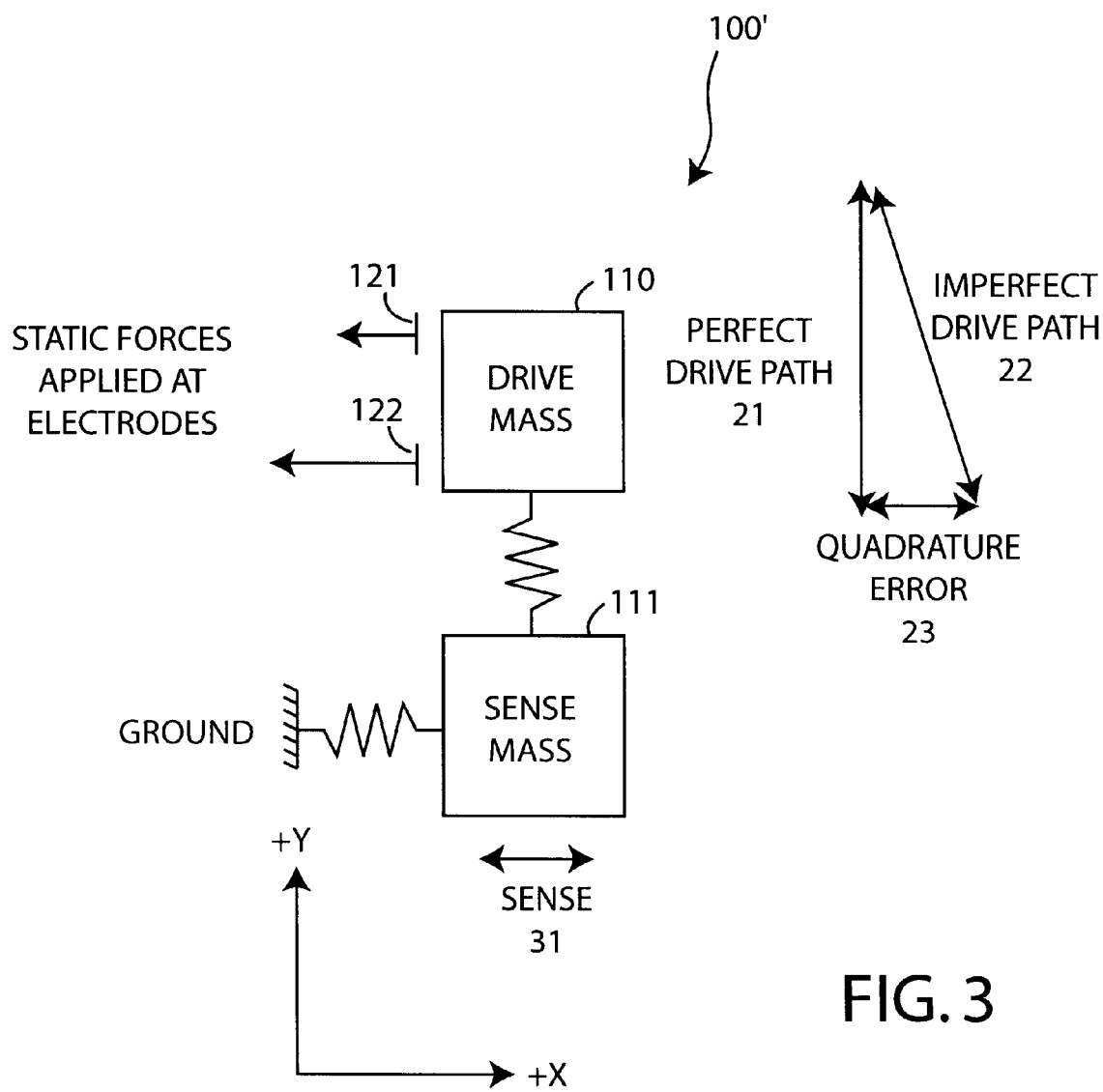
FIG. 3 is a simplified diagram of a modified micro-gyro 100', comparable to the micro-gyro of FIG. 2, but with static forces applied at electrodes 121, 122 adjacent to the drive mass 110 in accordance with this invention.

FIG. 3 is a simplified diagram of a modified micro-gyro 100' that uses a method of correcting quadrature in accordance with this invention. The micro-gyro 100' is comparable to the micro-gyro 100 of FIG. 2, but it includes first and second static force elements 121, 122 for applying first and second steady-state, non-time-varying force to first and second regions of the drive mass 110. The manner of generating the force may vary from embodiment to embodiment. The static force elements 121,122, for example, could cooperate with other suitable structure to apply an electrostatic force, a thermally induced force or a magnetically induced force.

The static force elements 121, 122 are positioned, as shown, such that they providing opposing forces to the structure (drive mass 110) to be moved. The force elements 121, 122 provide a controlled motion about an axis orthogonal to both the drive axis and the sense axis, i.e. about the rate axis. In the embodiment shown, the force elements control the motion of the drive mass 110 by selectively repositioning its drive axis (not shown, but nominally aligned with the Y-axis) around the rate axis or Z-axis such that the drive axis is orthogonal with the sense axis of the sense mass 111.

In the preferred embodiment, the static force elements 121, 122 are electrodes that are used to provide electrostatic forces by carrying voltages that are adjusted to a suitable steady-state value relative to a ground voltage on the drive mass 110. In the preferred embodiment, the voltages vary between 0 and 5 volts and the drive mass is held at a virtual ground of 2.5 volts.

Rotary Embodiment

FIG. 4 a simplified top plan view of a rotary motion micro-gyro 200. The operational concepts of a decoupled micro-gyro design of this nature are disclosed in U.S. Pat. No. 5,955,668, commonly owned by the assignee of this invention and hereby incorporated by reference in its entirety.

The illustrated gyro 200 has three main components: a substrate 201, a ring-shaped drive mass 210; and a disk-shaped sense element 211 that is located inside of the ring-shaped drive mass 210. The latter two elements 210, 211 are supported above the substrate 201 by a central anchor 202 and by suitable flexures (not separately numbered) so that they can vibrate within certain mechanical constraints. The ring-shaped drive mass 210 is supported to vibrate at a first frequency about a drive axis that is ideally aligned with the Z-axis and so that it responds to coriolis force by tending to tip and tilt relative to the XY plane at a second frequency. The disk-shaped drive mass 211 may rock about the Y axis and the flexures are designed to dynamically transfer energy from the drive mass 210 into the sense mass 211 in a resonant mode at the second frequency with relative efficiency. As a result of this geometry, and the resonant design of the flexures and the masses they support and connect, the tip and tilt energy of the drive mass 210 is dynamically coupled into the sense mass 211.

Unfortunately, however, the disk-shaped sense mass 211 is sensitive to any mechanical imperfection that causes the drive axis of the drive mass 210 to deviate from the Z axis in a direction about the X-axis (e.g., +Y or −Y direction when considering a positive component of the +Z axis only). Under such imperfect conditions, a quadrature component of the vibratory drive is coupled into the sense mass 211 and the sense mass 211 will tend to produce a "false positive" sense signal in the absence of an angular rate of rotation.

Figure 5:
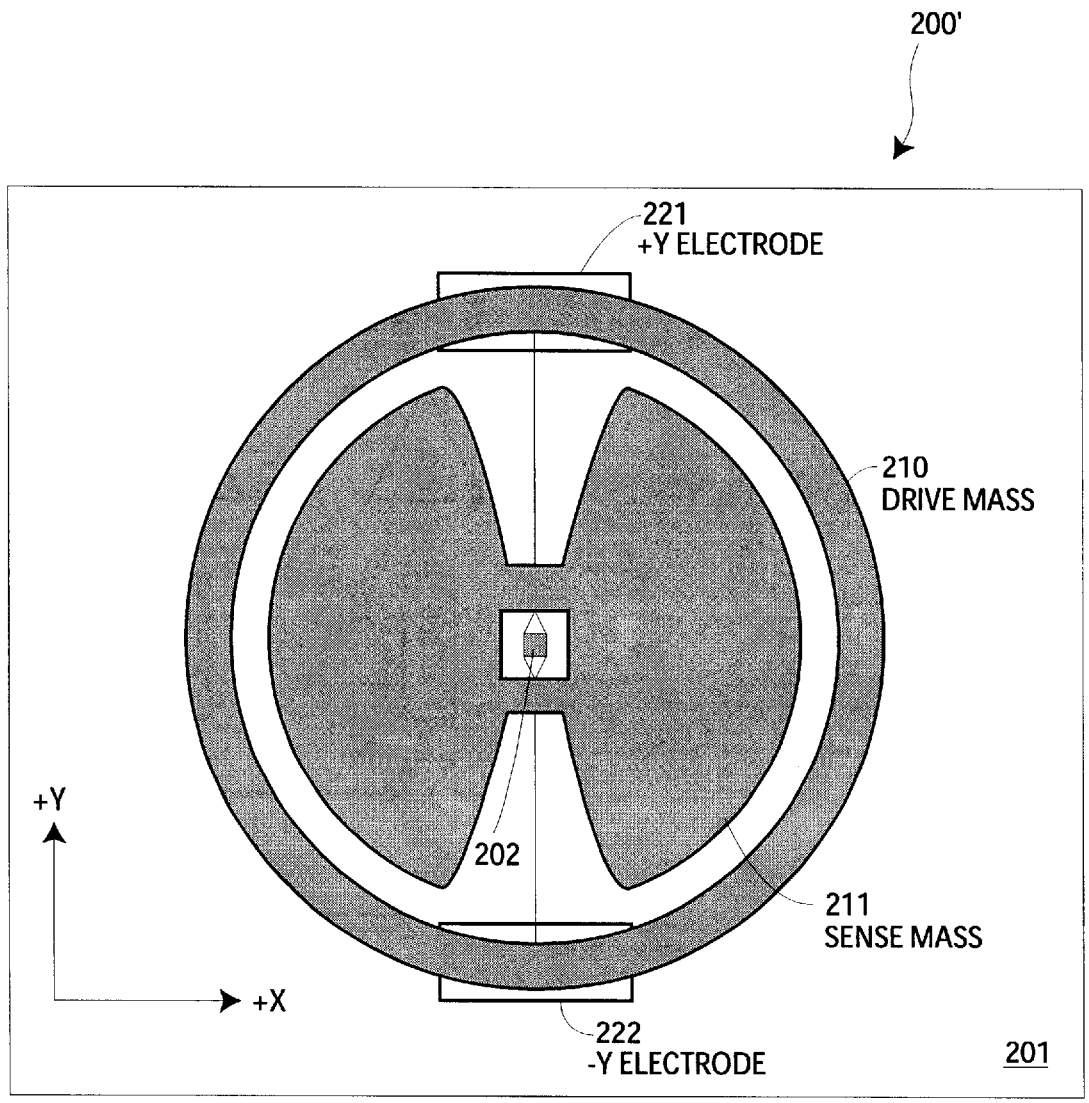
FIG. 5 is a simplified diagram of a modified micro-gyro 200', comparable to the micro-gyro of FIG. 4, but with static forces applied at electrodes or "torque pads" 221, 222 adjacent to the drive mass 210 in accordance with this invention.

FIG. 5 shows a presently preferred embodiment of the present invention that offers a solution to the problem. In particular, a +Y electrode 221 and a −Y electrode 222 are located on the substrate 201 below the ring-shaped drive mass 210 in order to apply a suitable steady-state force that rotates the drive axis about the rate axis (X-axis). The electrodes 221, 222 may be aptly regarded as torque pads. It is only necessary to torque the ring-shaped drive mass 210 about the X-axis, because only the imperfections about this axis tend to couple into the sense mass 211.

In operation, a steady-state force is applied to the +Y electrode 221 or to the −Y electrode 221 to re-orient the drive axis about the rate axis, aligning it perpendicular to the sense axis. Applying a steady-state force to the region of the drive mass 210 lying above one electrode 221, or the other 222, can effectively null out any quadrature error that may be present.

Closed Loop Feedback Control

A closed loop feedback control system is preferably provided in either embodiment in order to provide continuous cancellation of quadrature. The servo control system suitably applies correction forces to null out quadrature due to changing conditions such as temperature. While servo control systems are well known, the following circuits are offered to provide a clear understanding of the intended control system.

FIG. 6 is a block diagram of the presently preferred control circuitry or "Rate Processor Electronics" 300. The circuit 300 uses a motor position pickoff signal 301 and a rate pickoff signal 302 in order to extract an appropriate torque voltage signal 391 under a zero rate condition. The attainment of the motor position pickoff signal 301 and rate pickoff signal 302 are accomplished according to well-known means.

In operation, the motor position pickoff signal 301 is provided to a sine/cosine generator 310 that generates suitable sine and cosine reference signals SINE and COSINE in response thereto. The rate pickoff signal 302 is provided to a multiplier block 321, multiplied by the sine reference signal SINE, filtered 331, and amplified 341 to produce a baseband rate 381, a DC signal that is proportional to input rate. The rate pickoff signal 302 is also provided to a multiplier block 322, multiplied by the cosine reference signal COSINE, filtered 332, amplified 342 to produce a quadrature signal 349. The motion represented by the quadrature signal 349 is in phase with the motor position. It is desirable to make the quadrature signal 349 and corresponding motion as small as possible in order to minimize phase stability requirements on the electronics.

The objective of the control circuitry 300 is to drive the quadrature signal 340 to a minimum by applying a proportional control voltage or torque voltage 391 to the torque pads 221, 221 (see FIG. 5). This can be accomplished by using an integrator 350 to integrate the quadrature signal 349 and produce the torque voltage 391, which voltage is then applied to the torque pads 221, 222.

FIG. 7 shows the presently preferred circuitry for implementing the integrator 350 of FIG. 6. As shown, the integration is performed with an integrator circuit built around a simple operational amplifier (op-amp) 351. The gain and bandwidth requirements for the op-amp 351 are not critical. The quadrature control servo formed by the combination of the electronic and mechanical torquing is made unconditionally stable by virtue of the fact that the transducers and electronics in the servo have relatively wide bandwidth and there is a single integration.

Any variety of control circuits may be used to implement the method of this invention, the illustrated and just described circuitry 300 being but just one.

Variations

The preferred embodiments use two static force elements. It may be possible, of course, to design the micro-gyro so that it is mechanically biased to one side and pulled in the opposite direction with a single steady-state force. It is preferred, however, to use a mechanically balanced design and to selectively apply one of two steady-state forces to correct any deviation that exists from a balanced condition due to manufacturing tolerances. There also may be circumstances where three or more static force elements are desired, i.e. to provide additional granularity of control or to provide further balance about a particular axis.

I claim:

1. A method of correcting quadrature error in a micro-gyro having a drive mass that is vibrated relative to a drive axis and a sense mass that responds to the drive mass in the presence of an angular rate about a rate axis and a corresponding coriolis force by vibrating relative to a sense axis, the method comprising the steps of:
   providing a first static force element for applying a first steady-state force to a first region of the drive mass; and
   applying a corrective steady-state force to the drive mass with the first static force element, the corrective steady-state force re-orienting the drive mass to make the drive axis of the drive mass orthogonal to the sense axis of the sense mass.

2. The method of claim 1 wherein the corrective steady-state force re-orients the drive mass by repositioning the drive mass about the rate axis.

3. The method of claim 1 comprising the further step of providing a second static force element for applying a second steady-state force to a second region of the drive mass and wherein the applying step is accomplished by selectively applying a corrective steady-state force to one of the first and second static force elements.

4. The method of claim 3 wherein the first and second static force elements comprise first and second electrodes that provide an electrostatic force.

5. The method of claim 4 comprising the further steps of:
   connecting the drive mass to a ground voltage;
   holding one of the first and second electrodes at the ground voltage; and
   setting the other of the first and second electrodes to a voltage that is different than the ground voltage such that a corrective steady-state force of suitable direction and magnitude is applied to the drive mass.

6. The method of claim 5 comprising the further steps of establishing a direction and magnitude for the corrective steady-state force in the absence of an angular rate of rotation.

7. The method of claim 6 wherein the step of establishing a direction and magnitude for the corrective steady-state force in the absence of an angular rate of rotation is accomplished by:
   detecting a quadrature signal associated with a vibration of the sense mass in the absence of an angular rate of rotation;
   integrating the quadrature signal to produce a control voltage; and
   applying the control voltage to the first and second electrodes.

8. The method of claim 1 wherein the micro-gyro is linear in operation in that the drive mass is vibrated along the drive axis and the sense mass is vibrated along a sense axis.

9. The method of claim 1 wherein the micro-gyro is rotary in operation in that the drive mass is vibrated about the drive axis and the sense mass is vibrated about a sense axis.

10. The method of claim 9
    wherein the drive mass is ring-shaped;
    wherein the sense mass is disk-shaped; and
    wherein the first static force element is located below the ring-shaped drive mass.

11. The method of claim 10 further comprising the step of providing a second static force element for applying a second steady-state force to a second region of the ring-shaped drive mass, wherein the second static force element is located below the ring-shaped drive mass, and wherein the applying step is accomplished by selectively applying a corrective steady-state force to one of the first and second static force elements.

12. The method of claim 10 wherein the micro-gyro comprises:
    a substrate defining an XY plane with an X axis and Y axis and with a Z axis extending perpendicularly therefrom;
    wherein the ring-shaped drive mass is supported above the substrate by flexures that permit the ring-shaped drive mass to vibrate about a drive axis that is ideally aligned with the Z-axis and to tip and tilt relative to the XY plane;
    wherein the disk-shaped drive mass is supported above the substrate by flexures that substantially constrain it to rocking about the Y axis; and
    wherein the first and second static force elements are located at +Y and −Y locations below the ring-shaped drive mass in order to correct for the mechanical imperfection that would otherwise causes the drive axis of the drive mass to deviate from the Z axis by some angle about the X-axis.

13. The method of claim 1 wherein the first static force element comprises a thermal element that provides a thermally-induced force.

14. The method of claim 1 wherein the first static force element comprises a magnetic element that provides a magnetically-induced force.

15. The method of claim 1 wherein the micro-gyro is a dynamically decoupled micro-gyro.

* * * * *